US012448593B2

(12) United States Patent
Bishop et al.

(10) Patent No.: US 12,448,593 B2
(45) Date of Patent: Oct. 21, 2025

(54) SONIC INFUSION OF ALCOHOL

(71) Applicant: American Metal Whiskey LLC, Danbury, CT (US)

(72) Inventors: Chris Bishop, Ridgefield, CT (US); Randy Carlson, Ridgefield, CT (US); James Greco, Whitestone, NY (US)

(73) Assignee: American Metal Whiskey LLC, Danbury, CT (US)

( * ) Notice: Subject to any disclaimer, the term of this patent is extended or adjusted under 35 U.S.C. 154(b) by 0 days.

(21) Appl. No.: 18/611,258

(22) Filed: Mar. 20, 2024

(65) Prior Publication Data
US 2024/0240122 A1 Jul. 18, 2024

Related U.S. Application Data

(63) Continuation-in-part of application No. 17/869,374, filed on Jul. 20, 2022.

(60) Provisional application No. 63/223,757, filed on Jul. 20, 2021.

(51) Int. Cl.
*C12H 1/22* (2006.01)
*A23L 5/30* (2016.01)
*C12H 1/16* (2006.01)

(52) U.S. Cl.
CPC .............. *C12H 1/22* (2013.01); *A23L 5/32* (2016.08); *C12H 1/16* (2013.01)

(58) Field of Classification Search
CPC . C12H 1/22; C12H 1/165; C12H 1/16; C12G 3/07; C12G 3/08; H04R 1/028; A23L 2/50; A23L 5/32
See application file for complete search history.

(56) References Cited

U.S. PATENT DOCUMENTS

| 2,088,585 | A | * | 8/1937 | Chambers | C12H 1/16 426/238 |
| 2,138,051 | A | | 11/1938 | Williams | |
| 2,693,943 | A | * | 11/1954 | Fowle | B01F 31/831 68/3 R |
| 2,775,434 | A | * | 12/1956 | Clemens | B06B 1/0655 366/127 |
| 4,576,824 | A | | 3/1986 | Gubiev et al. | |
| 7,063,867 | B2 | | 6/2006 | Tyler et al. | |

(Continued)

FOREIGN PATENT DOCUMENTS

DE 202019000621 3/2019
EP 0336262 3/1989
(Continued)

OTHER PUBLICATIONS

Translation of DE 202019000621U1 (Year: 2019).*
(Continued)

*Primary Examiner* — Drew E Becker
(74) *Attorney, Agent, or Firm* — Meister Seelig & Fein PLLC

(57) ABSTRACT

A system to treat spirits with sound, the system including a wooden barrel configured to hold the spirits, at least one speaker, the speaker being configured to play a repeated pattern of sound into the spirits inside the barrel, the repeated pattern of sound being configured to cause the spirits to move inside the barrel in at least one waveform at a determined harmonic point, and a playback device to control qualities of the repeated pattern of sound.

22 Claims, 7 Drawing Sheets

(56) References Cited

U.S. PATENT DOCUMENTS

| | | | |
|---|---|---|---|
| 7,220,439 B2 | 5/2007 | Leonhardt et al. | |
| 9,637,712 B2 | 5/2017 | Davis | |
| 9,637,713 B2 | 5/2017 | Davis | |
| 10,041,027 B2 | 8/2018 | Evans et al. | |
| 10,087,406 B2 | 10/2018 | Bailey et al. | |
| 10,196,595 B2 | 2/2019 | Butte | |
| 10,508,259 B2 | 12/2019 | Davis | |
| 10,544,386 B2 | 1/2020 | Davis | |
| 10,604,730 B2 | 3/2020 | Bailey et al. | |
| 10,889,787 B2 | 1/2021 | Fearnside et al. | |
| 10,947,488 B2 | 3/2021 | Davis | |
| 11,214,766 B2 | 1/2022 | Evans et al. | |
| 11,339,359 B2 | 5/2022 | Davis | |
| 11,649,422 B2 | 5/2023 | Bailey et al. | |
| 2006/0165855 A1* | 7/2006 | Leonhardt | C12H 1/165 426/238 |
| 2008/0008796 A1* | 1/2008 | Cassone | A23L 5/32 426/237 |
| 2016/0129407 A1 | 5/2016 | Wrosch et al. | |
| 2016/0355771 A1 | 12/2016 | Davis | |
| 2016/0376538 A1 | 12/2016 | Niaz | |
| 2017/0369831 A1* | 12/2017 | Dhesi | C12M 35/04 |
| 2018/0051240 A1 | 2/2018 | Au | |
| 2019/0292503 A1* | 9/2019 | Lehman | C12G 3/04 |
| 2020/0071645 A1* | 3/2020 | Meyer | B01F 31/86 |
| 2021/0102148 A1 | 4/2021 | Fearnside et al. | |
| 2021/0179985 A1 | 6/2021 | Haller | |
| 2021/0321648 A1* | 10/2021 | Martin | A21D 6/00 |
| 2022/0053802 A1* | 2/2022 | Wampfler | C12G 1/02 |
| 2022/0411731 A1* | 12/2022 | Lye | C12H 1/16 |
| 2023/0100879 A1* | 3/2023 | Lehman | C12H 1/22 99/277.2 |
| 2023/0167388 A1* | 6/2023 | Pizon | C12C 11/11 426/61 |
| 2024/0240122 A1* | 7/2024 | Bishop | C12H 1/16 |
| 2024/0294857 A1* | 9/2024 | Bishop | C12G 3/07 |

FOREIGN PATENT DOCUMENTS

| | | | | |
|---|---|---|---|---|
| EP | 469585 A * | 2/1992 | | A23L 2/50 |
| EP | 477583 A * | 4/1992 | | A23L 2/50 |
| FR | 3035119 | 4/2015 | | |
| WO | 2005039789 | 5/2005 | | |
| WO | WO-2005039789 A1 * | 5/2005 | | B08B 9/08 |
| WO | WO2016024084 | 2/2016 | | |

OTHER PUBLICATIONS

Translation of KR 100628342B1 (Year: 2006).*
Translation of FR 3035119A1 (Year: 2016).*
Sound NPL, https://www.sciencelearn.org.nz/resources/2816-sound-wave-interference (Year: 2019).*
Allison Shoemaker, "TIL you can speed-age whiskey with sound waves," https://thetakeout.com/til-you-can-speed-age-whiskey-with-sound-waves-1826642625; published Jun. 7, 2018.
Brad Japhe, "How Distilleries Use Hip-Hop, EDM and Reggae to Age Booze," https://www.billboard.com/music/music-news/distilleries-using-music-to-age-booze-8460802/; published Jun. 20, 2018.
Thom Dunn, "Metallica releases a new whiskey aged on the sounds of heavy metal," https://boingboing.net/2022/05/23/metallica-releases-new-whiskey-aged-on-the-sounds-of-heavy-metal.html; published May 23, 2022.
Christopher Osburn, "Loud Music is the Key Ingredient in This Distiller's Brandy," https://www.thrillist.com/drink/nation/aging-liquor-using-music-sonic-aging; published Oct. 8, 2015.
Copper and Kings website, "Copper & Kings American Craft Brandy," https://www.copperandkings.com/our-craft; archived website from Feb. 7, 2021.
Dark Island Spirits webpage, "Musically Matured," https://www.darkislandspirits.com/musically-matured; archived website from Dec. 1, 2019.
Tara Nurin, "Now You Can Taste Aged Whiskey Without the Age," https://www.forbes.com/sites/taranurin/2018/05/31/now-you-can-taste-aged-whiskey-without-the-age/?sh=744432223efe; May 31, 2018.
Lewin Day, "Aging Alcohol in 30 Minutes," https://hackaday.com/2019/11/14/aging-alcohol-in-30-minutes/; Nov. 14, 2019.
Harrison Williams, "Distilleries are Using Music to Age Alcohol with 'Sonic Aging'"; https://mixmag.net/read/distilleries-are-using-music-to-age-alcohol-with-sonic-aging-news; Jun. 20, 2018.
M.J. Delgado-Gonzalez, M.M. Sanchez-Guillen, M.V. Garcia-Moreno, M.C. Rodriguez-Dodero, C. Garcia-Barroso, D. A. Guillen-Sanchez; "Study of a laboratory-scaled new method for the accelerated continuous ageing of wine spirits by applying ultrasound energy"; Ultrasonics Sonochemistry 36 (2017) 226-235.
Jake Emen, "Rapid-Aging Whiskey Technology: Game Changer or Gimmick?"; https://thewhiskeywash.com/whiskey-styles/american-whiskey/rapid-aging-whiskey-technology-game-changer-gimmick/; Sep. 8, 2016.
Blackened Whiskey Website; "Black Noise"; https://blackenedwhiskey.com/black-noise/; accessed May 27, 2021.
Caskers Website, "Blackened American Whiskey"; https://www.caskers.com/blackened-american-whiskey/; accessed Apr. 12, 2021.
Series of photographs of package and bottle of Blackened Whiskey, all circa Feb. 2024.

* cited by examiner

SONIC INFUSION OF ALCOHOL

CROSS-REFERENCE TO RELATED APPLICATIONS

This continuation-in-part application claims priority under 35 U.S.C. § 120 from U.S. application Ser. No. 17/869,374, filed Jul. 20, 2022 in the United States Patent and Trademark Office, which claims priority to U.S. Provisional Application No. 63/223,757, filed on Jul. 20, 2021, in the United States Patent and Trademark Office, the disclosures of which are incorporated herein in their entirety by reference.

BACKGROUND

Conventional processes to age alcoholic spirits involve storing the spirits in wooden barrels, otherwise known as "barrel aging." Since wood is naturally porous, over time the liquid spirits stored in the barrels move in and out of the wood of the barrels, gaining particular color and flavor attributes therefrom. Different producers and different spirits use different wood and different aging times. For example, many American whiskeys are aged in charred oak barrels. Some whiskies, such as scotch, have a required minimum aging time before they are deemed fit for consumption.

Conventionally in barrel aging, the barrels and the spirits are left stationary with occasional hydration by misting or hosing water onto the barrels. The spirits are allowed to age naturally using time, temperature, and humidity to cause the spirits to move in and out of the wood of the barrel. There may be occasional movement of the barrels as they are moved from one part of a storage facility to another, either to rotate stock or to control the temperature and humidity the spirits stored in the barrels are exposed to. However, this movement is infrequent, and traditional methods of barrel aging rely primarily on static processes, i.e., allowing the spirits to sit undisturbed for an extended time.

A significant factor in barrel aging is the amount of interaction between the spirits and the wood of the barrel. Conventional methods of barrel aging increase this interaction by increasing the amount of surface area of the wood that is exposed to the spirits. For example, wood pieces may be added to the spirits in the barrel, or a batch of spirits may be stored in multiple small barrels instead of one large barrel. However, aside from increasing surface area, there is no conventional method to increase the interaction between the wood and the spirits.

Conventional methods of barrel aging have multiple drawbacks. First, it takes a significant amount of time for the spirits to interact sufficiently with the wood of the barrel to be properly aged—anywhere from weeks to years, depending on the spirit. During this time, some portion of the spirits is lost to evaporation—a portion known in the industry as the "angel's share." Furthermore, different climates lead to different results. For example, whiskey being aged in a hot and humid climate such as Kentucky will lose spirits to evaporation faster than whiskey being aged in a moderate or cold and dry environment such as Vermont. As a result, spirits have different characteristics depending on where they were barrel-aged.

As such, there is a need for a way to better control the barrel-aging process. This would allow distillers to account for the different environments the spirits are aging in and give better control over the spirits produced.

SUMMARY OF THE INVENTION

Exemplary embodiments of the present general inventive concept provide systems, methods, and devices which may generate movement of the spirits in a barrel to encourage the changes typically resulting from aging. Specifically, according to exemplary embodiments of the present general inventive concept, systems, methods, and devices use sound waves to encourage interaction between the spirits and the wood of the barrel.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a system to treat spirits with sound, the system including a wooden barrel configured to hold the spirits, at least one speaker, the speaker being configured to play a repeated pattern of sound into the spirits inside the barrel, the repeated pattern of sound being configured to encourage the spirits to interact with the wood of the barrel in at least one waveform at a determined harmonic point, and a playback device to control qualities of the repeated pattern of sound.

In an exemplary embodiment, the qualities of the repeated pattern of sound may include at least one of a frequency, a duration, and a volume of the sound.

In an exemplary embodiment, the playback device may be configured to control the qualities of the repeated pattern of sound to determine one or more harmonic points in the spirits.

In an exemplary embodiment, the repeated pattern of sound may be a repeated clip of sound having a predetermined length.

In an exemplary embodiment, the predetermined length may be equal to or less than about twenty seconds.

In an exemplary embodiment, the predetermined length may be between about ten seconds and about fifteen seconds.

In an exemplary embodiment, the predetermined length may be between about two seconds and about five seconds.

In an exemplary embodiment, the average volume of the repeated pattern of sound may be between about 40 dB and about 140 dB.

In an exemplary embodiment, the average volume of the repeated pattern of sound may be between about 65 dB and about 110 dB.

In an exemplary embodiment, the at least one speaker may be disposed inside the barrel.

The foregoing and/or other features and utilities of the present general inventive concept may be achieved by providing a method of treating spirits in a wooden barrel, the method including playing a repeated pattern of sound through at least one speaker into the spirits inside the barrel, the repeated pattern of sound being configured to encourage the spirits to move inside of the barrel in at least one waveform at a determined harmonic point, and controlling qualities of the repeated pattern of sound with a playback device.

In an exemplary embodiment, the qualities of the repeated pattern of sound may include at least one of a frequency, a duration, and a volume of the sound.

In an exemplary embodiment, the qualities of the repeated pattern of sound may be controlled to determine one or more harmonic points in the spirits.

In an exemplary embodiment, the repeated pattern of sound may be a repeated clip of sound having a predetermined length.

In an exemplary embodiment, the predetermined length may be equal to or less than about twenty seconds.

In an exemplary embodiment, the predetermined length may bet between about ten seconds and about fifteen seconds.

In an exemplary embodiment, the predetermined length may be between about two seconds and about five seconds.

In an exemplary embodiment, the average volume of the repeated pattern of sound is between about 40 dB and about 140 dB.

In an exemplary embodiment, the average volume of the repeated pattern of sound is between about 65 dB and about 110 dB.

In an exemplary embodiment, the method may include disposing the at least one speaker inside the barrel.

DETAILED DESCRIPTION OF EXEMPLARY EMBODIMENTS OF THE INVENTIVE CONCEPT

Figure 1:
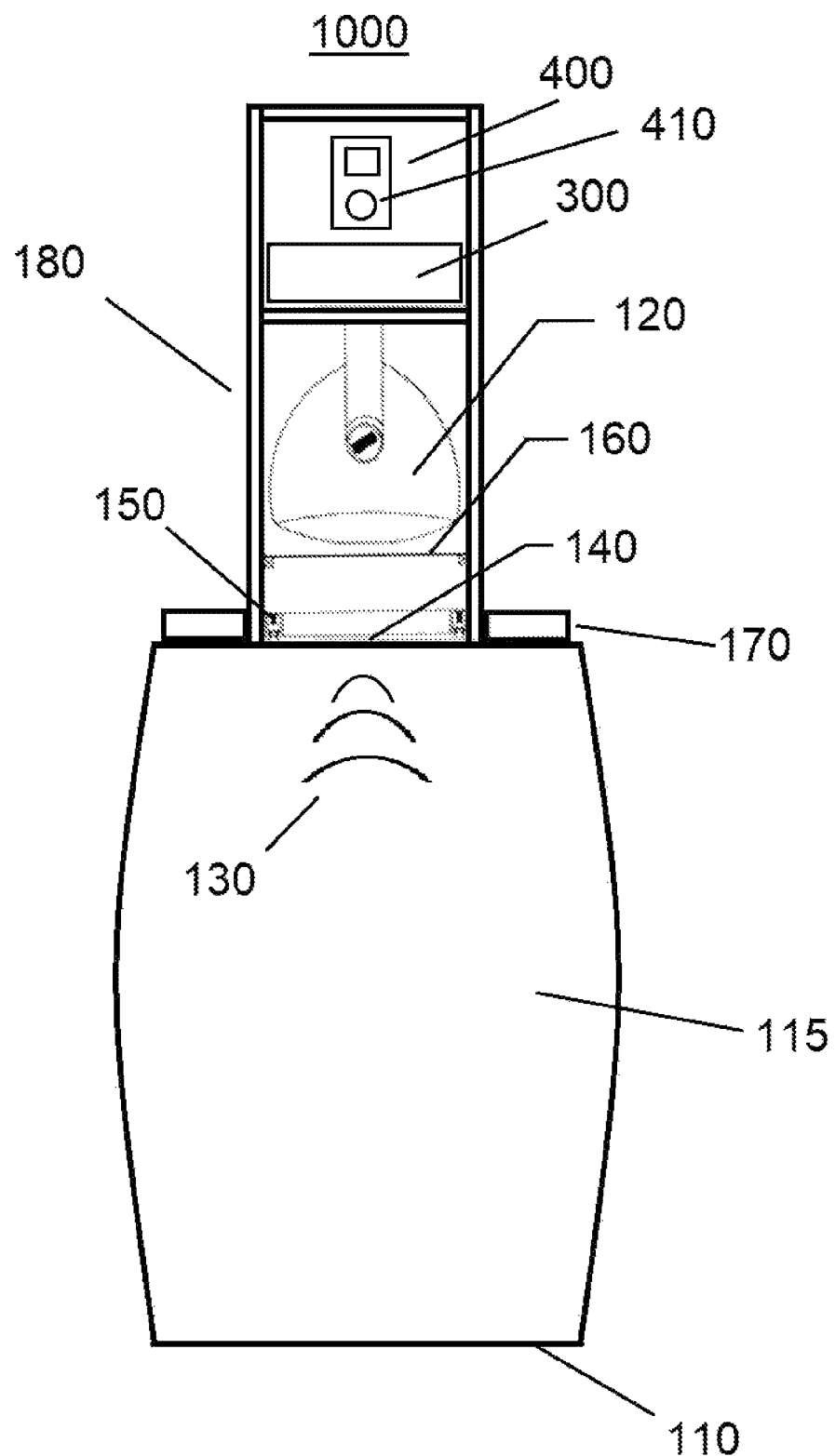
FIG. 1 illustrates a barrel and external speaker assembly according to an exemplary embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, certain terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to accompanying drawings.

FIG. 1 illustrates a barrel 110 with an external speaker assembly 1000 according to an exemplary embodiment of the present general inventive concept. The barrel 110 may be made of any material suitable for barrel aging, e.g., charred oak. The barrel 110 may also be any size or shape according to the particular exemplary embodiment of the present general inventive concept. The barrel 110 may be partially or completely filled with liquid spirits 115. For the purposes of this disclosure, "spirits" or "liquid spirits" encompasses any liquid which may be aged in a wooden barrel, i.e., may be allowed to interact with the wood of the barrel 110 to gain particular characteristics therefrom. Examples of such spirits 115 include but are not limited to: whiskey, bourbon, rye, rum, tequila, cognac, brandy, gin, and juniver.

As illustrated in FIG. 1, according to exemplary embodiments of the present general inventive concept the speaker assembly 1000 may include one or more external speakers 120 located on the outside of the barrel 110, such external speaker(s) 120 being configured to play sound waves 130 into the spirits 115. The speaker(s) 120 may be constructed of any materials suitable to the specific exemplary embodiment of the present general inventive concept. The speaker(s) 120 may also be any size or shape suitable to the specific exemplary embodiment, and any number of speakers 120 may be used, in any configuration, based on the size of shape of the barrel 110 and the desired qualities of the sound waves 130. For the purposes of this disclosure, qualities of the sound waves 130 include but are not limited to frequency, volume, and/or duration of play.

According to exemplary embodiments of the present general inventive concept, the speaker(s) 120 may be located anywhere on the surface of the barrel 110, including along the curved sides or at one or more ends of the barrel 110, where the barrel surface may be flat. If the speaker(s) 120 are disposed in a location where they may come into contact with the spirits 115, e.g., on the side or bottom of the barrel 110, the speaker(s) 120 used may be waterproof. According to an exemplary embodiment of the present general inventive concept illustrated in FIG. 1, the speaker assembly 1000 may be located at an upper portion of the barrel 110, such that the speaker(s) 120 are separated from the spirits 115 inside of the barrel 110, and furthermore gravity does not push the spirits 115 against the speaker(s) 120. If the speaker(s) 120 are kept from physically contacting the spirits 115, the speaker(s) 120 may not need to be waterproof to function reliably.

The sound waves 130 may comprise a repeated pattern of sound. The sound waves 130 may be a specific sound such as, for example, the exhaust note of a particular model of car, which may be looped or played repeatedly to extend the time the spirits 115 are exposed to the sound 130. The speaker(s) 120 may play the sound waves 130 into the wood of the barrel 110 to be transmitted into the spirits 115. Alternatively the speaker(s) 120 may play the sound waves 130 into the spirits 115 through a hole 140 cut into the wall of the barrel 110. The hole 140 may be approximately the shape of the speaker assembly 1000, such that the wall of the barrel 110 does not obstruct the speaker(s) 120, and the speaker(s) 120 may face the spirits 115 directly. According to exemplary embodiments of the present general inventive concept, one or more speakers 220 (illustrated in FIG. 4) may be positioned internally in the barrel 110, and may similarly play sound waves 130 into spirits 115.

Playing the sound waves 130 into the spirits 115 may introduce vibrations into the spirits 115. These vibrations may encourage the spirits 115 to move in and out of the wood of the barrel 110, causing the spirits 115 and the wood to interact and exchange liquid, esters, and color, thereby encouraging the changes in the spirits 115 typically resulting from the barrel-aging process. This process of using sound waves 130 to encourage interaction between the spirits 115 and the barrel 110 may be referred to as sonic infusion of the spirits 115.

Sonic infusion may allow more control over the time and quality of the barrel aging of the spirits 115. By increasing the rate at which the spirits 115 interact with the wood, there may be greater transference of the character imparted by the wood barrel 110 in significantly less time than in conventional methods. Sonic infusion of the spirits 115 may thereby accelerate the changes typically resulting from barrel aging, reducing the time needed to barrel age the spirits 115 and in turn reducing the amount of spirits 115 lost to evaporation during the aging process. Furthermore, a user may control the qualities of the sound 130, including frequency, volume, duration, etc. For example, the user may replace a recording being used to produce the sound waves 130 with a different recording, the user may change the volume, etc. Different sound qualities may induce different vibrations in the spirits 115, which in turn may affect how the spirits 115 interact with the wood of the barrel 110. Sonic infusion thereby may allow more control over how the spirits 115 interact with the wood of the barrel 110, which may allow greater control over the resultant characteristics of the spirits 115, e.g., flavor, color, smoothness, etc. That is, the qualities of the sound 130 may be changed as desired to control the rate at which the spirits 115 interact with the wood of the barrel 110, as well as control the characteristics of the spirits 115 resulting from the barrel aging.

The qualities of the barrel 110 being used, e.g., size, shape, and type of wood, may affect the sound waves 130 played into the spirits 115, as well as the characteristics of the spirits 115 themselves. Accordingly, exemplary embodiments of the present general inventive concept may use any number of different sizes and shapes of barrel 110, as well as any number of types of wood for the barrel 110.

The speaker assembly 1000 may further include a soundproof seal 150, e.g., a rubber seal, provided around the perimeter of the speaker assembly 1000, to help keep all sound from the speaker(s) 120 contained in the area of the spirits 115. Furthermore, if the speaker(s) 120 are not waterproof, a liquid shield 160 may also be provided between the speaker(s) 120 and the spirits 115 to keep the speaker(s) 120 from being in direct contact with the spirits 115. The liquid shield 160 may be, e.g., a perforated metal sheet such as a screen which allows sound waves 130 from the speaker(s) 120 to pass therethrough, but blocks splashes or droplets of the spirits 115 from passing through to contact the speaker(s) 120.

As illustrated in FIG. 1, a speaker assembly 1000 may further include a power amplifier 300 and a playback device 400. The power amplifier 300 may amplify an external voltage to a level sufficient to power the speaker(s) 120. The amplifier 300 may be any such device suitable to power the speaker(s) 120 being used in the particular exemplary embodiment of the present general inventive concept. According to exemplary embodiments of the present general inventive concept, the playback device 400 may be, e.g., a smartphone, an mp3 player, or any other device capable of providing audio to the speaker(s) 120 to be played. The playback device 400 may also include a user interface 410 allowing a user to modify the qualities of the sound waves 130, for example changing the volume, the frequency, which particular sound is being played, etc. The user interface 410 may be, e.g., controls disposed on the playback device 400 itself, or may be a remote device connected wirelessly to the playback device 400.

According to exemplary embodiments of the present general inventive concept, the playback device 400 may be self-contained, i.e., it may play pre-recorded sounds over the speaker(s) 120. This may allow a "set and forget" arrangement in which a user may set the playback device 400 to play a pre-recorded set of sound waves 130 for a predetermined amount of time. After setting the playback device 400 to play, the user may walk away and allow the spirits 115 to be treated with sonic infusion for a desired length of time. According to other exemplary embodiments of the present general inventive concept, the playback device 400 may be controllable, meaning the qualities of the sound waves 130 being played may be modified during the sonic infusion process. For example, while the spirits 115 are being treated a user may change the volume of the sound waves 130, change the frequency, change which sound is being played, etc. via the user interface 410. Controlling the qualities of the sound waves 130 in this manner may allow for more precise control of the barrel aging process and the resulting spirits 115. For example, as the barrel aging process progresses, the spirits 115 may change in, for example, specific gravity or density due to evaporation. If the playback device 400 is controllable, the sound waves 130 may be adjusted as the barrel aging process progresses, thereby accounting for the changes in the spirits 115 and encouraging a desired optimum interaction between the spirits 115 and the barrel 110. This "optimum interaction" is described in greater detail below. Similarly, the user may adjust the sound waves 130 with the playback device 400 to account for the acoustics of different barrels 110, e.g., different barrel shapes, different types of wood, etc., and thereby the user may achieve the optimum desired interaction between the spirits 115 and the wood of the barrel 110.

Figure 2A:
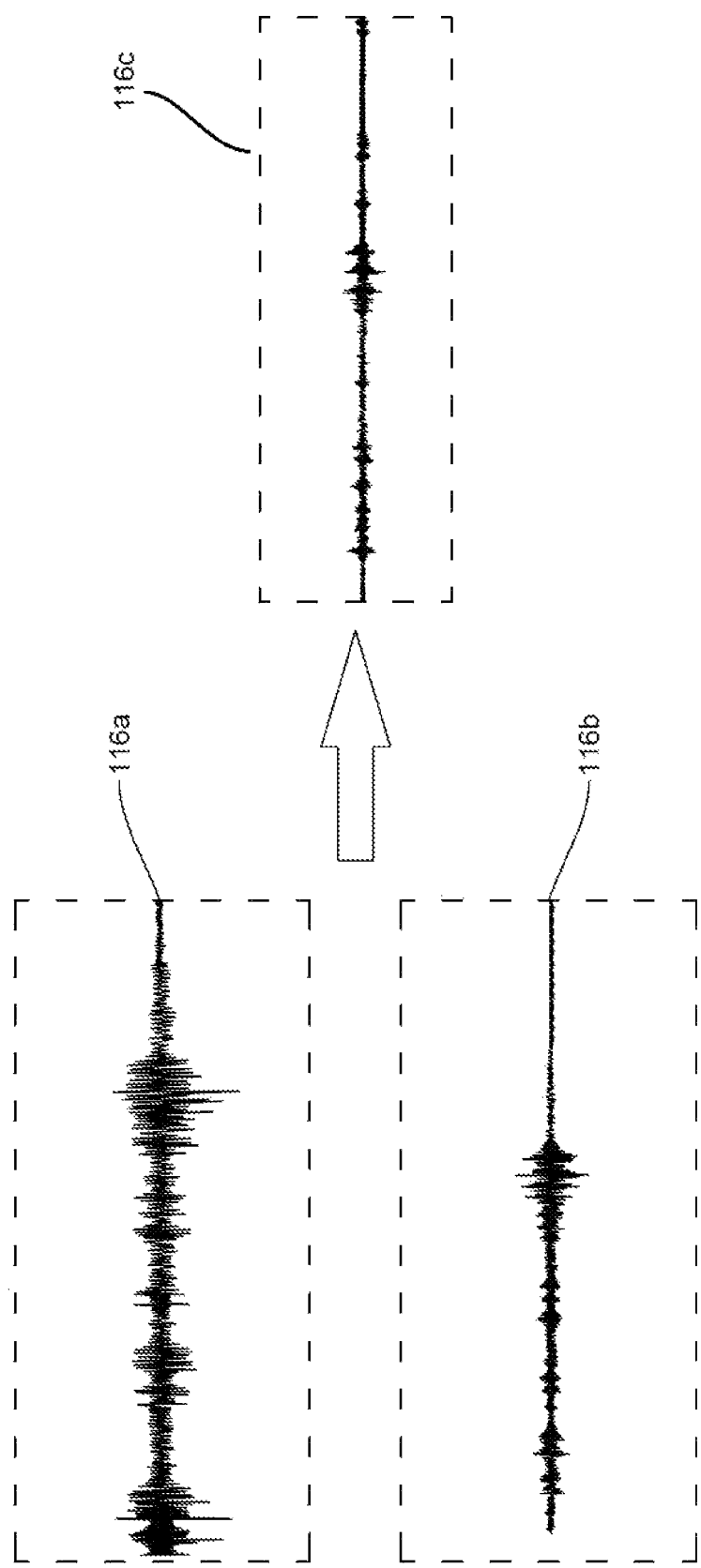
FIGS. 2A and 2B illustrate an interaction of waveforms inside of a barrel according to exemplary embodiments of the present general inventive concept.
Figure 2B:
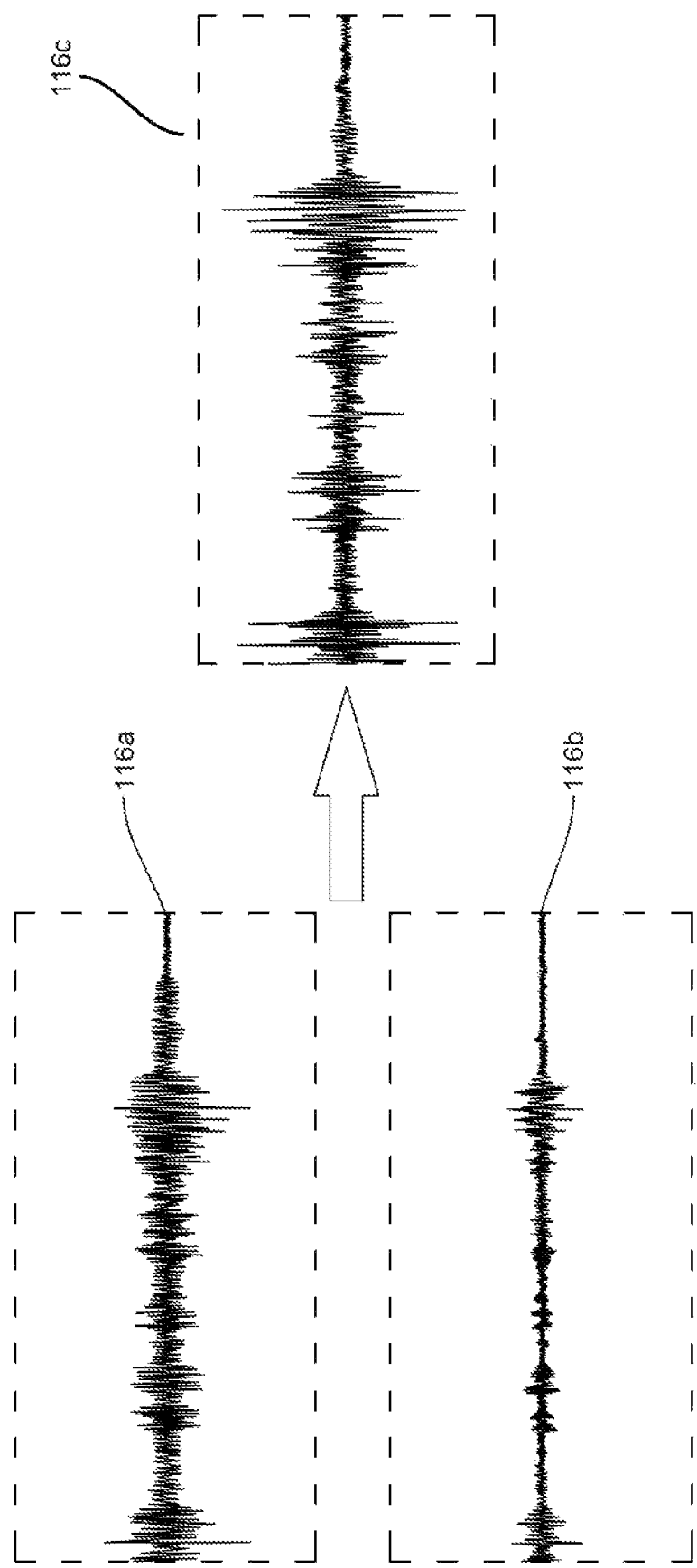

According to exemplary embodiments of the present general inventive concept, as soundwaves are played into the spirits 115 of the barrel 110, the soundwaves may cause the spirits 115 to move within the barrel 110 according to at least one waveform. According to exemplary embodiments of the present general inventive concept, the movement of the spirits 115 may have a first waveform 116*a*. As the spirits 115 move according to this first waveform 116*a* and contact the walls of the barrel 110, the moving spirits 115 may be reflected off of the walls. This reflection may generate movement in the spirits 115 having a second waveform 116*b*. FIGS. 2A and 2B illustrate exemplary embodiments of the first and second waveform 116*a* and 116*b*. Movement of the spirits 115 represented by these two waveforms 116*a* and 116*b* may cause the spirits 115 to interact with the wood of the walls of the barrel 110.

As the moving spirits 115 reflect off the walls of the barrel and encounter spirits 115 being pushed away from the speaker(s) 120, 220, the first and second waveforms 116*a*, 116*b* may interact with each other. Depending on the qualities of the sound, the first and second waveforms 116*a*, 116*b* may interfere with or cancel each other out, as illustrated in FIG. 2A, which shows the first and second waveforms 116*a*, 116*b* and their combined waveform 116*c*. Alternatively, depending on the qualities of sound, the first and second waveforms 116*a*, 116*b* may instead enhance and amplify each other, similar to how an object may vibrate more intensely when exposed to sound at its resonant frequency. An example of this enhancement is illustrated in FIG. 2B, illustrating the combined waveform 116*c* from first and second waveforms 116*a* and 116*b*. The combination of qualities of sound, including but not limited to frequency, duration, and volume, which causes this enhanced movement in the spirits 115 may also be called a "harmonic point." At a harmonic point, the amplified movement of the spirits 115 inside the barrel 110 may in turn encourage further interaction between the spirits 115 and the wood of the barrel 110. For the purposes of this application, "harmonic point" may include any combination of qualities of sound that causes enhanced movement in the spirits 115. According to exemplary embodiments of the present general inventive concept, there may be a range of sound qualities that result in such enhanced movement, such that a harmonic point is not a specific set of sound qualities but a range thereof. For example, a given harmonic point may include a range of frequencies. Multiple harmonic points may exist for any given combination of sounds being played, the spirits 115, and barrel 110. Different harmonic points may have different results on the spirits 115. For example, one harmonic point may cause more interaction with the wood of the barrel 110 than another harmonic point. A user may therefore control the characteristics of the spirits 115, for example taste, by conducting the sonic infusion process at a harmonic point causing a desired level of interaction with the wood of the barrel 110.

A harmonic point may be considered as an "optimum interaction" for sonic infusion, because at a harmonic point the spirits 115 may interact more efficiently with the barrel 110, which may affect the length of time it takes for a spirit 115 to be fully treated. For the purposes of this application, "fully treated" means a spirit 115 which has had sufficient interaction with the barrel 110 to attain a desired set of characteristics, such as flavor, color, smoothness, etc. Spirits which are fully treated may be considered fit for sale and consumption. When treating a given spirit 115 with sonic infusion outside of a harmonic point, it may take, for example, 18 months to fully treat the spirit 115. According to exemplary embodiments of the present general inventive concept, treating the same spirit 115 with sonic infusion at a harmonic point may reduce the time to fully treat the spirit 115 to as little as six months.

According to exemplary embodiments of the present general inventive concept, each combination of spirits 115, barrel 110, and sound may have its own unique set of harmonic points, due to variations in the individual barrel 110 and the spirits 115, in addition to the qualities of the sound. A user may determine one or more harmonic points for a given combination of spirits 115, barrel 110, and sound by adjusting the qualities of the sounds being played and assessing the impact it has on the spirits 115, for example by taste-testing the spirits 115 over the course of sonic infusion to determine how sonic infusion is progressing and the effect it has on the spirits 115. The user may also therefore control the sonic infusion process to take place at one or more harmonic points, in order to achieve more efficient interaction between the spirits 115 and the barrel 110, and obtain a desired result.

Figure 3B:
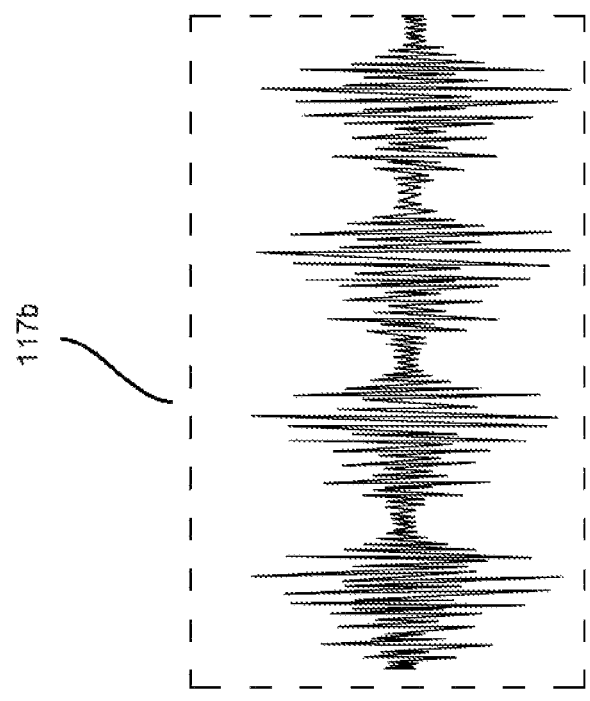
FIGS. 3A and 3B illustrate two waveforms of sounds according to exemplary embodiments of the present general inventive concept.
Figure 3A:
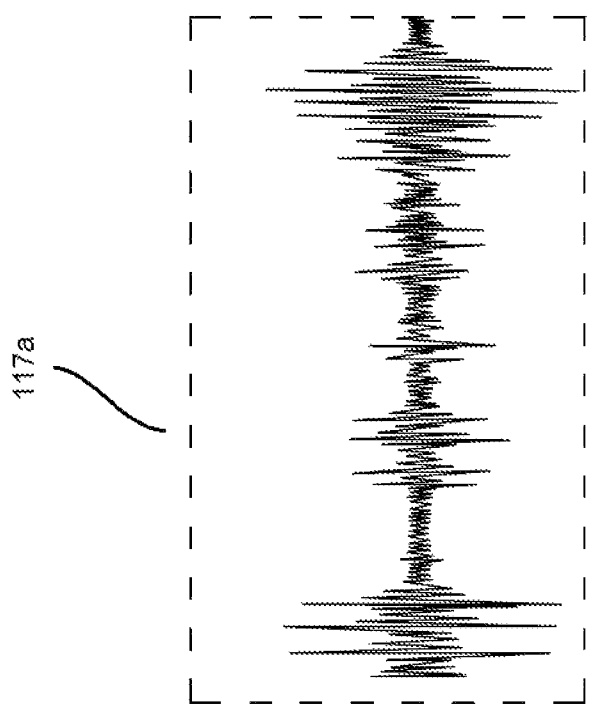

According to exemplary embodiments of the present general inventive concept, a given sound may be played on a loop, meaning a clip of a given sound is played repeatedly over and over. For the purposes of this application, "duration" of a sound may refer to a length of a sound clip used to treat the spirits 115, this sound clip potentially being looped or repeated to generate continuous sound for a desired time period. According to exemplary embodiments of the present general inventive concept, a sound clip may have a duration of up to 20 seconds. According to other exemplary embodiments, a sound clip may have a duration of about 10 seconds to about 15 seconds. According to other exemplary embodiments, a clip may have a length of about 2 seconds to about 5 seconds. A given sound clip may include multiple high and low points in volume, and may further include a plurality of different frequencies. A clip of a relatively shorter duration may have more consistent sound, making it easier for a user to find a harmonic point. For example, a two-second clip may have less variation in volume and frequencies than a 15-second clip. As a result, a shorter sound clip may create a consistent pattern in the waveforms 116*a* and 116*b* when played on a loop. In comparison, a 15-second clip of the same recording may have greater variation in volume and frequencies, which may cause more complicated interactions between the waveforms 116*a* and 116*b*, which in turn may make it more difficult to find a harmonic point where the two waveforms 116*a* and 116*b* consistently enhance once another. See for example FIG. 3A, illustrating a waveform 117*a* for a clip of a given sound being played, and FIG. 3B, illustrating a more regular waveform 117*b*, generated by looping a shorter clip of the same sound, i.e., taking a clip with a shorter duration and repeating it for the same length of time as the total length of the sound clip illustrated in FIG. 3A. According to exemplary embodiments of the present general inventive concept, the total length of the loop, or total length of time the spirits 115 are exposed to the sound waves 130, may be adjusted to control the sonic infusion process and an extent to which the spirits 115 interact with the barrel 110.

The volume or intensity of the sound, measured for example in decibels (dB), may also affect the final quality of the treated spirits 115. As the sound volume is increased, the spirits 115 may interact more extensively with the wood of the barrel 110. Since more interaction with the barrel 110 imparts more flavor from the wood, including the esters and flavonoids therein, the higher the sound volume, the more flavor may be imparted in a given span of time. As such, treating the spirits 115 at a relatively high volume may impart a more pronounced flavor to them. The reverse is also true: as the sound volume is lowered, the spirits 115 may interact less extensively with the barrel 110, thereby gaining less flavor from the wood, and resulting in a more subtle flavor. As such, a user may control the qualities of spirits 115 being treated with sonic infusion by adjusting the sound volume. Furthermore, the volume of the sound may affect how the first and second waveforms 116*a*, 116*b* interact, which in turn may affect the movement of the spirits 115 in the barrel 110. As such, the volume of the sound being played may be a factor in finding one or more harmonic points for the spirits 115.

According to exemplary embodiments of the present general inventive concept, the sound volume during sonic infusion may be between a lower threshold intensity and an upper threshold intensity. Below the lower threshold intensity, the sound may have a negligible effect on the spirits 115 and their interaction with the wood of the barrel 110. Above the upper threshold of intensity the sound may cause the barrel 110 to vibrate, causing the barrel 110 to expand and contract and potentially compromising the barrel's structural integrity. Such a violent interaction may also disrupt the movement of the spirits 115, due to the force of the soundwaves 115 and/or the additional movement of the barrel 110.

If the movement of spirits 115 is disrupted in this manner, it may not achieve a harmonic point, and as such the spirits 115 may not achieve optimum interaction with the barrel 110. According to exemplary embodiments of the present general inventive concept, the lower threshold may be about 5 dB. According to exemplary embodiments of the present general inventive concept, the upper threshold of volume may be about 140 dB. It will be understood that the lower threshold and upper threshold of volume may vary with the type of barrel 110 used and spirits 115 being treated. According to exemplary embodiments of the present general inventive concept, the sound may be played at a volume between about 40 dB and about 140 dB. According to other exemplary embodiments of the present general inventive concept, the sound may be played at a volume between about 65 dB and about 110 dB. It will be understood that the sound volume may be the average intensity across a given clip, since the volume of a given clip may vary over the length of the clip.

The sound being played may be a captured sound, meaning a sound recorded from a machine, creature, or other object that naturally creates sound, as opposed to a sound which was specifically composed and performed for sonic infusion. An example of a captured sound is the exhaust note of a specific car. If the sound is a captured sound, it may be played at a similar volume as the original source of the sound. For example, if the sound is the exhaust note of a car, the speaker(s) 120, 220 may play the sound at the same volume as if the car were next to or inside of the barrel 110. According to other exemplary embodiments of the present general inventive concept, a captured sound may be played at a higher or lower volume than the original source of the sound.

Figure 5:
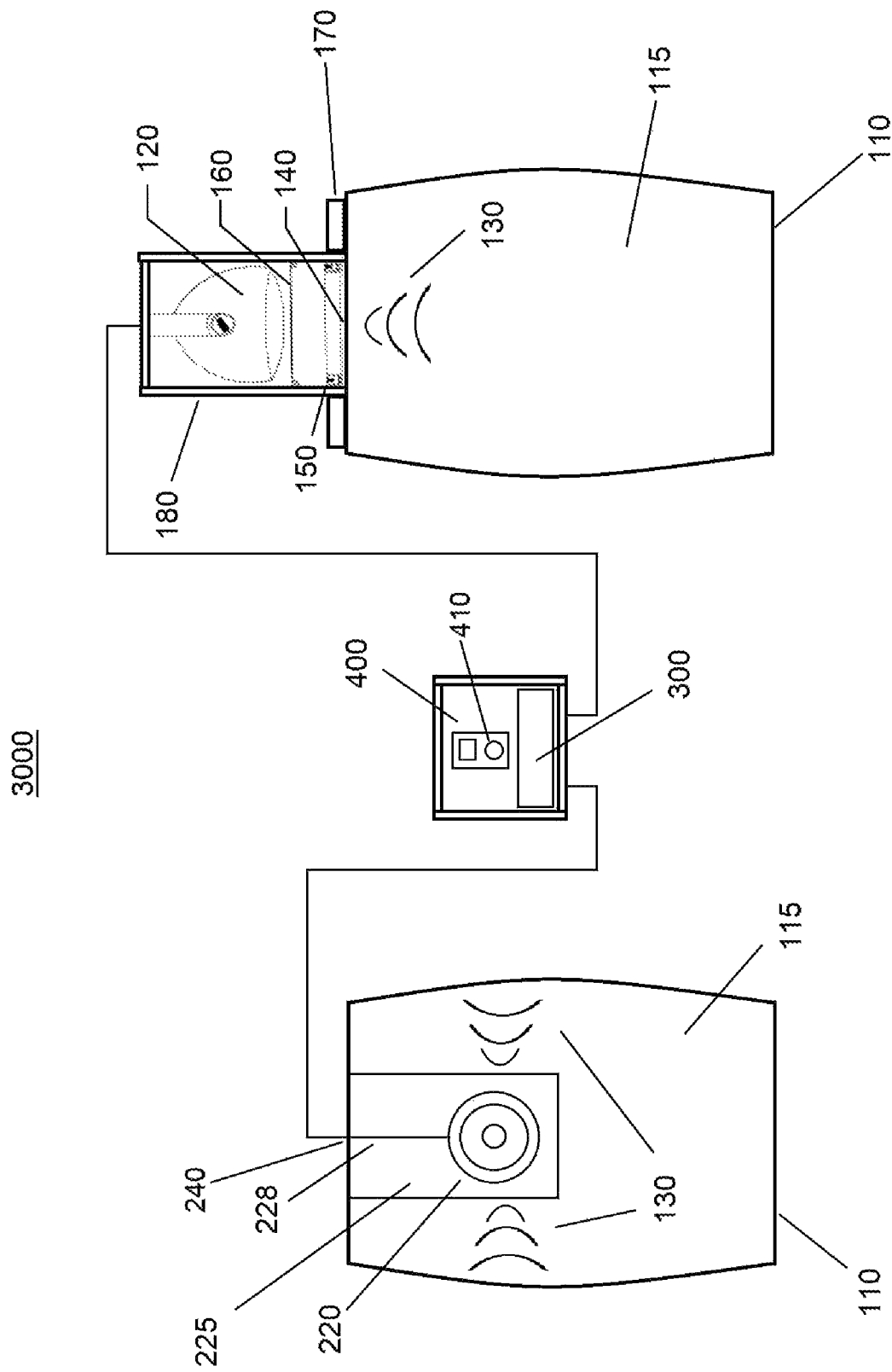
FIG. 5 illustrates a sonic infusion system including a plurality of barrels according to another exemplary embodiment of the present general inventive concept.
Figure 6:
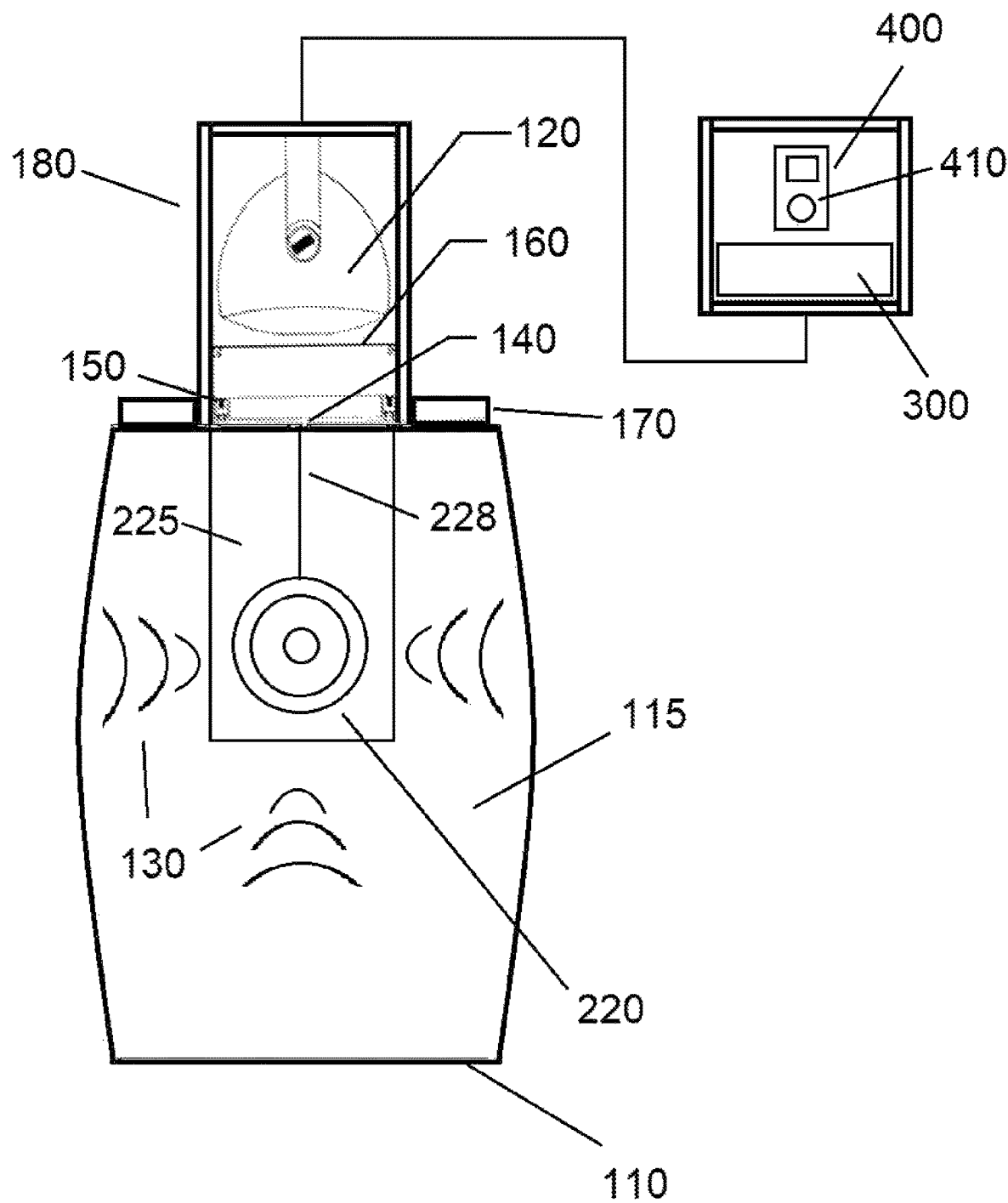
FIG. 6 illustrates a barrel and speaker assembly according to another exemplary embodiment of the present general inventive concept.

According to exemplary embodiments of the present general inventive concept, the speaker assembly 1000 may include an enclosure 180, e.g., a box formed around the speaker(s) 120, to protect the speaker assembly 1000 from outside contamination, e.g., dust, dirt, etc., as well as to help maintain an airtight seal around the speaker(s) 120 to isolate the atmosphere over the spirits 115. The enclosure 180 may also reduce transmission of sound outside of the barrel 110 while sound waves 130 are being played into the spirits 115. According to exemplary embodiments of the present general inventive concept, the enclosure 180 may be open at the end facing the barrel 110, so as not to interfere with the transmission of sound waves 130 into the spirits 115. Furthermore, according to exemplary embodiments of the present general inventive concept, the speaker enclosure 180 may be formed from the same wood as the barrel 110, to help maintain consistent sound characteristics and to help match the natural expansion and contraction of the wood of the barrel 110 with heat and humidity. Furthermore, although in FIG. 1 the amplifier 300 and playback device 400 are illustrated inside the enclosure 180, according to other exemplary embodiments of the present general inventive concept the enclosure 180 may only enclose the speaker(s) 120, with the amplifier 300 and playback device 400 being located external to the enclosure 180. FIGS. 5 and 6, described below, illustrate exemplary embodiments of the present general inventive concept with an amplifier 300 and playback device 400 disposed outside of the enclosure 180.

The enclosure 180 may be affixed to the barrel 110 with clamps 170. The enclosure 180 may be removed from the barrel 110 by disengaging the clamps 170, such that the enclosure 180 may be removed from the barrel 110 without compromising the structure of the barrel 110 itself. The clamps 170 thereby may help keep the environment around the spirits 115 stable and isolated from the outside air. The enclosure 180 may therefore be replaced or worked on without damaging the barrel 110 and compromising the atmosphere around the spirits 115, which may affect the barrel-aging process.

Figure 4:
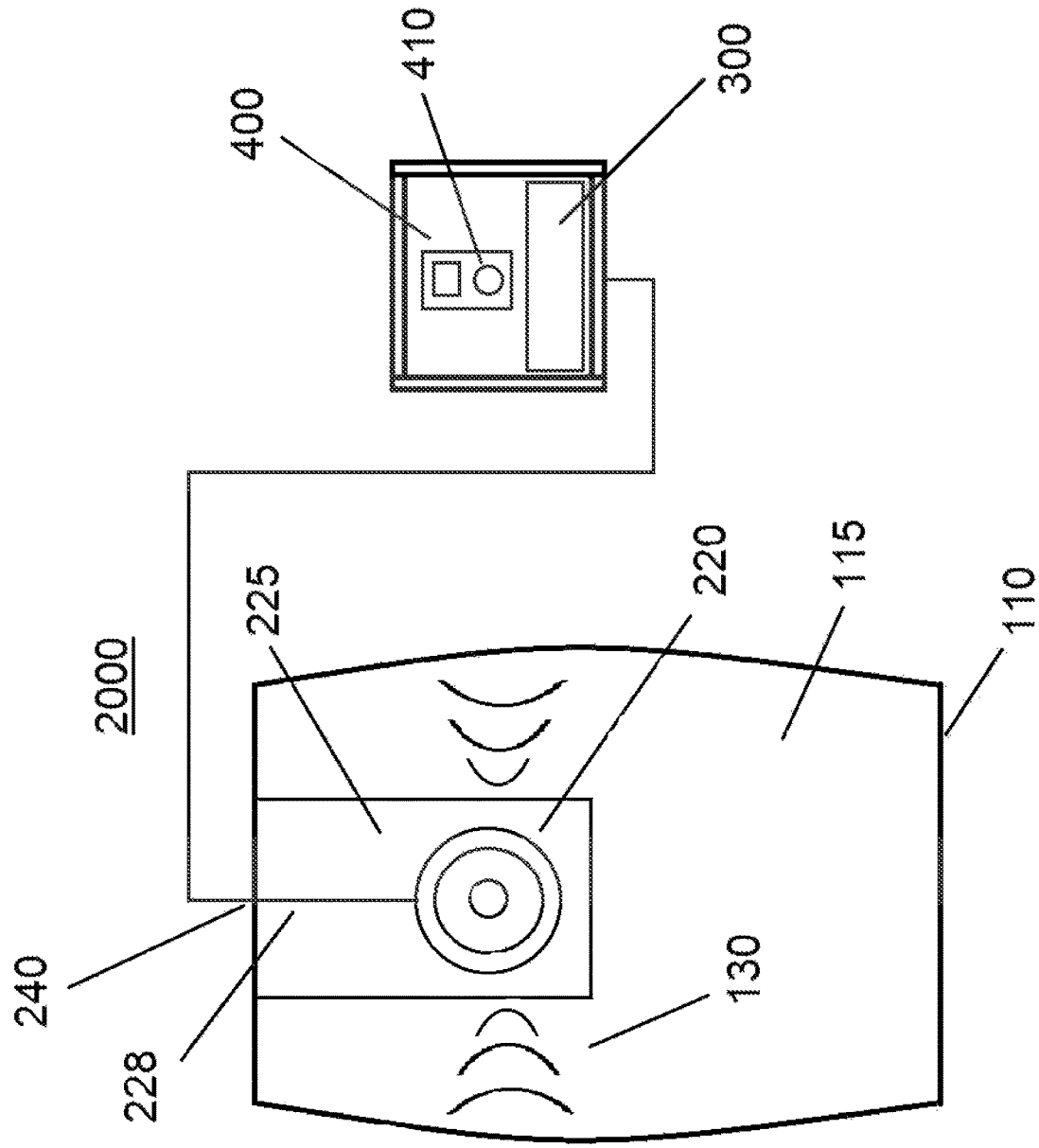
FIG. 4 illustrates a barrel and internal speaker assembly according to another exemplary embodiment of the present general inventive concept.

FIG. 4 illustrates a barrel 110 and internal speaker assembly 2000 according to another exemplary embodiment of the present general inventive concept. As illustrated therein, according to this exemplary embodiment one or more internal speakers 220 may be included inside the barrel 110, and may play soundwaves 130 into the spirits 115. Although only one speaker 220 is illustrated, it will be understood that any number of speakers 220 may be included inside the barrel 110 in the manner shown. According to exemplary embodiments of the present general inventive concept, the barrel 110 and spirits 115 may be substantially the same as those described above with regard to FIG. 1.

The speaker(s) 220 may be constructed of waterproof, non-porous materials which will not interact with the spirits 115, thereby allowing the speaker(s) 220 to be immersed in the spirits 115. The speaker(s) 220 may be configured to play sound waves 130 directly into the spirits 115, thereby encouraging the spirits 115 to interact with the wood of the barrel 110. Although sound waves 130 may be played at a different volume or frequency to account for the different acoustics of the speaker(s) 220 being immersed in the spirits 115, the sound waves 130 may still encourage the spirits 115 to interact with the wood of the barrel 110 similarly to the exemplary embodiment discussed above with reference to FIG. 1.

As illustrated in FIG. 4, the speaker(s) 220 may be attached to one or more anchor points 225 which may be fastened securely in place, e.g., to one end of the barrel 110. The anchor point(s) 225 may hold the speaker(s) 220 in place in the barrel 110. The anchor point(s) 225 may be, e.g., a board affixed to one end of the barrel 110 and extending into the barrel's interior. According to exemplary embodiments of the present general inventive concept, the anchor point 225 may be made of the same wood as the rest of the barrel 110. According to exemplary embodiments of the present general inventive concept, the anchor point(s) 225 may be removable, e.g., by sliding the board out of the barrel 110 via an opening cut into the barrel 110. As a result, the internal speaker(s) 220 may be removed from the barrel 110 to be replaced or serviced without compromising the structure of the barrel 110.

The one or more speakers 220 may be connected to an external power amplifier 300 and playback device 400. The amplifier 300 and playback device 400 may function in substantially the same way as described above with regard to FIG. 1. Similarly, the playback device 400 may be controllable via user interface 410, allowing modification of the qualities of the sound 130 during sonic infusion. The speaker(s) 220 disposed inside the barrel 110 may be connected to the power amplifier 300 and playback device 400 via a liquid-proof cable 228 which passes through a hole 240 in the barrel 110. According to exemplary embodiments of the present general inventive concept, this hole 240 is preferably sealed such that it is waterproof and airtight, thereby keeping the environment around the spirits 115 constant. The hole 240 may also be of sufficient size that the anchor point 225 and speaker 220 may be removed from and inserted into the barrel 110 therethrough.

The above exemplary embodiments each have their own advantages. External speaker assembly 1000, in which spirits 115 are treated with one or more speakers 120 located outside of the barrel 110 as illustrated in FIG. 1, may allow more room for the speakers 120, since the speakers 120 are not limited by the size of the barrel 110. Furthermore, if a liquid shield 160 is used, the speaker(s) 120 do not need to be waterproof. As a result, external speaker assembly 1000 has few restrictions on what kind of speakers 120 may be used. As a result, external speaker assembly 1000 may allow for more control over sound quality, available volume and frequency, etc.

In comparison, in internal speaker assembly 2000 the speaker(s) 220 are enclosed inside the barrel 110 as illustrated in FIG. 4. As a result the barrel 110 may be more easily sealed against the outside environment, since a relatively smaller hole 240 must be cut in the barrel 110 to admit the liquid-proof cable 228, as compared to the hole 140 cut to allow an external speaker 120 to interact with the liquid 115. This may help maintain a stable environment around the spirits 115, which is desirable for barrel-aging. Furthermore, when one or more speakers 220 are immersed in the spirits 115, the sound from the speaker(s) 220 may be more evenly distributed through the spirits 115 in the barrel 110, thereby causing the spirits 115 to interact with the barrel 110 more uniformly across the interior surface thereof. The speaker(s) 220 therefore may encourage more uniform barrel aging in the spirits 115. The even distribution of the sound waves 130 through the spirits 115 may also cause a different rate of interaction between the spirits 115 and the wood of barrel 110 than when an external speaker 120 is used instead.

FIG. 5 illustrates a sonic infusion system 3000 according another exemplary embodiment of the present general inventive concept. As illustrated therein, the same power amplifier 300 and playback device 400 may be used with a plurality of barrels 110. According to exemplary embodiments, in this system 3000 one or more barrels 110 may be configured similarly to FIG. 4, including one or more internal speakers 220 connected via a liquid-proof cable 228 extending from each barrel 110 to the power amplifier 300 and playback device 400. Furthermore, one or more barrels 110 may be configured similarly to FIG. 1, in which one or more external speakers 120 inside speaker enclosures 180 are placed on the outside of one or more barrels 110. As illustrated in FIG. 5, the speakers 120 and 220 of sonic infusion system 3000 may all use the same power amplifier 300 and playback device 400. The speaker(s) 120 may be connected to the power amplifier 300 and playback device 400 through cables passing through the speaker enclosures 180.

FIG. 6 illustrates an exemplary embodiment of the present general inventive concept including a speaker assembly 4000 including speakers 120, 220 disposed both inside and outside of a barrel 110, to play sound waves 130 into the spirits 115. As illustrated therein, such a speaker assembly 3000 may include external speaker(s) 120 disposed in an enclosure 180 outside the barrel 110 as well as internal speaker(s) 220 disposed on an anchor point 225 inside the barrel 110. The speakers 120, 220 may use the same amplifier 300 and playback device 400, which may be disposed separately from the barrel 110. The speakers 120, 220 may also use the same hole 140 in the surface of the barrel, such that speaker(s) 120 may play sound waves 130 through the hole 140, liquid-proof cable 228 may pass through the hole 140 to power the speaker(s) 220, and anchor point 225 and speaker(s) 220 may pass through the hole 140 to be inserted into the barrel 110.

The speaker assembly 4000 may allow for relatively greater control over the sound 130 being used for sonic infusion of the spirits 115, since it allows for both more powerful external speaker(s) 120 and more uniform sound distribution into the spirits 115 through internal speaker(s) 220.

A variety of different sounds 130 may be played into the spirits 115 according to exemplary embodiments of the present general inventive concept. These sounds 130 may include, for example, exhaust notes from cars and motorcycles, airplane noises, turbines, boats, music, and natural events such as volcanic eruptions. The frequencies used may be in the audible range of frequencies, between about 20 Hz and about 20 kHz, to generate the movement in the spirits 115 described above. Frequencies above the audible range, for example over 20 KHz, may cause agitation and/or cavitation in the spirits 115, which may heat the spirits 115 and may also separate molecules of the spirits 115, instead of causing the spirits 115 to move in the waveforms 116a, 116b described above. As such, frequencies above 20 KHz may not cause the desired interaction between the spirits 115 and the wood of the barrel 110 described above.

According to exemplary embodiments of the present general inventive concept, the sound 130 may have frequencies in the range of about 60 Hz to about 4 KHz. More specifically, the sound 130 may have frequencies in the range of about 60 Hz to about 1.5 kHz. According to exemplary embodiments of the present general inventive concept, the sounds may have a dominant frequency, meaning a frequency with the highest magnitude, of about 67 Hz.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g. wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A system to treat spirits with sound, the system comprising:
    a wooden barrel configured to hold the spirits;
    at least one speaker, the speaker being configured to play a repeated pattern of sound into the spirits inside the barrel to cause the spirits to move inside the barrel in a first waveform in response to the repeated pattern of sound and a second waveform caused by reflections of the first waveform off the inside of the barrel; and a playback device configured to control qualities of the repeated pattern of sound to cause the first and second waveforms to amplify each other without inducing vibrations in the barrel that disrupt either of the first or second waveform, the playback device being configured to control a volume of the repeated pattern of sound to control a degree of interaction between the spirits and the barrel.

2. The system of claim 1, wherein the qualities of the repeated pattern of sound include at least one of a frequency, a duration, and a volume of the sound.

3. The system of claim 2, wherein the repeated pattern of sound is a repeated clip of sound having a predetermined length.

4. The system of claim 3, wherein the predetermined length is equal to or less than about twenty seconds.

5. The system of claim 3, wherein the predetermined length is between about ten seconds and about fifteen seconds.

6. The system of claim 3, wherein the predetermined length is between about two seconds and about five seconds.

7. The system of claim 2, wherein the average volume of the repeated pattern of sound is between about 5 dB and about 140 dB.

8. The system of claim 2, wherein the average volume of the repeated pattern of sound is between about 65 dB and about 110 dB.

9. The system of claim 1, wherein the at least one speaker is disposed inside the barrel.

10. The system of claim 1, wherein the speaker is configured to play the repeated pattern of sound directly into the spirits through a hole in a wall of the barrel.

11. The system of claim 1, further comprising a hole disposed in a wall of the barrel
wherein the at least one speaker is removably attached to a wall of the barrel at an anchor point adjacent to the hole, the speaker being configured to play the repeated pattern of sound through the hole, the anchor point forming an airtight seal around the hole when the speaker is attached to the wall.

12. A method of treating spirits in a wooden barrel, the method comprising:
playing a repeated pattern of sound through at least one speaker into the spirits inside the barrel, the repeated pattern of sound being configured to cause the spirits to move inside of the barrel in a first waveform in response to the repeated pattern of sound and a second waveform caused by reflections of the first waveform off the inside of the barrel;
controlling qualities of the repeated pattern of sound with a playback device to cause the first and second waveforms to amplify each other without inducing vibrations in the barrel that disrupt either of the first or second waveform; and
controlling a volume of the repeated pattern of sound to control a degree of interaction between the spirits and the barrel.

13. The method of claim 12, wherein the qualities of the repeated pattern of sound include at least one of a frequency, a duration, and a volume of the sound.

14. The method of claim 13, wherein the repeated pattern of sound is a repeated clip of sound having a predetermined length.

15. The method of claim 14, wherein the predetermined length is equal to or less than about twenty seconds.

16. The method of claim 14, wherein the predetermined length is between about ten seconds and about fifteen seconds.

17. The method of claim 14, wherein the predetermined length is between about two seconds and about five seconds.

18. The method of claim 13, wherein the average volume of the repeated pattern of sound is between about 5 dB and about 140 dB.

19. The method of claim 13, wherein the average volume of the repeated pattern of sound is between about 65 dB and about 110 dB.

20. The method of claim 12, further comprising disposing the at least one speaker inside the barrel.

21. The method of claim 12, further comprising playing the repeated pattern of sound directly into the spirits through a hole in a wall of the barrel.

22. The method of claim 12, further comprising:
disposing a hole in a wall of the barrel;
removably attaching the speaker to a wall of the barrel at an anchor point adjacent to the hole, the anchor point forming an airtight seal around the spirits when the speaker is attached to the wall; and
playing the repeated pattern of sound through the hole.

* * * * *